Feb. 22, 1966 P. KANTROWITZ 3,236,956

REPLACEABLE STYLUS HOLDERS FOR PHONOGRAPH PICKUPS

Original Filed July 6, 1962 3 Sheets-Sheet 1

INVENTOR.
P. KANTROWITZ

BY

OSTROLENK, FABER, GERB AND SOFFEN
ATTORNEYS

Feb. 22, 1966 P. KANTROWITZ 3,236,956

REPLACEABLE STYLUS HOLDERS FOR PHONOGRAPH PICKUPS

Original Filed July 6, 1962 3 Sheets-Sheet 2

INVENTOR.
P. KANTROWITZ

BY

OSTROLENK, FABER, GERB AND SOFFEN
ATTORNEYS

Feb. 22, 1966 P. KANTROWITZ 3,236,956

REPLACEABLE STYLUS HOLDERS FOR PHONOGRAPH PICKUPS

Original Filed July 6, 1962 3 Sheets-Sheet 3

INVENTOR.
P. KANTROWITZ

BY

OSTROLENK, FABER, GERB AND SOFFEN
ATTORNEYS

United States Patent Office 3,236,956
Patented Feb. 22, 1966

3,236,956
REPLACEABLE STYLUS HOLDERS FOR PHONOGRAPH PICKUPS

Philip Kantrowitz, Bronx, N.Y., assignor to Sonotone Corporation, Elmsford, N.Y., a corporation of New York Continuation of application Ser. No. 207,902, July 6, 1962. This application July 1, 1965, Ser. No. 470,339
10 Claims. (Cl. 179—100.41)

This is a continuation of my application Serial No. 207,902, filed July 6, 1962, now abandoned.

This invention relates to replaceable stylus holders for phonograph pickups which play back or transduce record groove undulations into corresponding electric signal output. Although some of the features of the invention are applicable to phonograph pickups which play back monophonic groove records, the present invention is of special value in playing back two related record sequences from different transverse segmental portions of the record groove, for instance, from what is known as a "45—45" stereophonic groove record system, such as described in Keller et al. Patent No. 2,114,471.

More specifically, the present invention relates to replaceable self-supporting stylus holders or stylus drive structures which drive the mechano-electric transducer or transducers of the pickup structure of the type which has an elongated stylus drive member carrying at its thin front end two or one groove engaging stylus and joined with its rear end to a parallel or generally coaxial elongated stiff seating structure adapted to be detachably retained within a seating recess of the pickup structure.

In the heretofore known stylus drive structures of the foregoing type the elongated stylus drive member had its rear end seated within an elongated elastomer body portion held enclosed in a tubular elongated recess of the adjoining front end of the seating structure thereof. In such known pickup drive structures, the stylus drive member is thin and readily damaged when subjected in use to a jolt or the like. In such known detachable stylus drive structures it is difficult to assure proper coaxial alignment of the stylus drive member with its transducing coupling axis. Such known stylus drive structures also impose limitations on the separation of the two high-frequency signal output sequences obtained from a stereophonic pickup.

Among the objects of the invention is to provide a phonograph pickup having a detachable stylus drive structure of the foregoing type, which is free from and overcomes their above explained and their other heretofore encountered limitations and difficulties.

It is also among the objects of the invention to provide a detachable stylus drive structure for phonograph pickups which will assure that the stylus drive member remains properly aligned in operative position relative to its seating structure; which will simplify the assembly of its components into a foolproof and relatively rugged unit; and which will provide for better separation of the two high-frequency signal outputs when playing back stereophonic groove records.

In accordance with the invention the elongated replaceable self-supporting stylus drive structure for a phonograph pickup has a large cross-section and large volume elastomer junction body interposed between the front end or end region of its elongated seating member and the nearby rear end or end region of its elongated stylus drive member so that the stylus-carrying drive member may be flexed on the interposed large cross-section elastomer body portion as much as 90° relatively to its proper transducer alignment axis while assuring retention of the drive member in operative alignment on the pickup.

As used herein in the specification and claims, the word "elastomer" means substances having the properties of natural or synthetic rubber or rubber-like substances. Elastomers must stretch rapidly and considerably under tension and must retract rapidly when released from such tension. Elastomers thus exhibit resilience and low permanent set when subjected to deformation.

In such replaceable elongated stylus drive structures of the invention, the elastomer junction body of substantial cross-sectional area is placed with a separator length thereof between and joining the stylus-drive-member rear end to the nearby yet separated seating-member front end. This wide area separator length of the elastomer junction body has opposite elastomer end portions affixed to the nearby yet separated ends of the elongated stylus drive member and the elongated seating member to provide a relatively strong yet flexible pivot support for the rear end of the stylus drive member. The relatively wide elastomer junction body which joins the rear end of the stylus drive rod to the seating-member front end interposes a definite elastomer separator length between them. Because of the relatively great width of the interposed elastomer separator length its compliance may be readily controlled over a very wide range, by choice of its relative hardness or compliance and of its shape, such as its length and cross-section. The interposed elastomer separator length may be thus given a selected high compliance or low compliance or a selected intermediate compliance, for selectively providing a pickup which will deliver a low output, or high output or a selected intermediate level output, respectively.

The foregoing and other objects of the invention will be best understood from the following description of exemplifications thereof, reference being had to the accompanying drawings, wherein.

Figure 10:
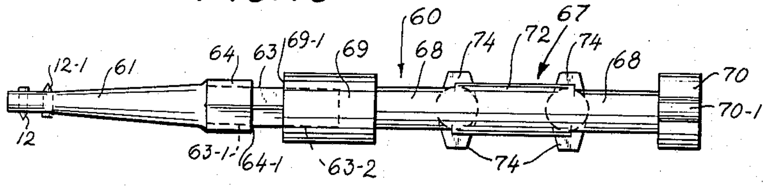
FIG. 10 is a side view and FIG. 11 is a greatly enlarged side view of the same stylus drive structure of the invention, as seen in FIG. 2.
Figure 15:
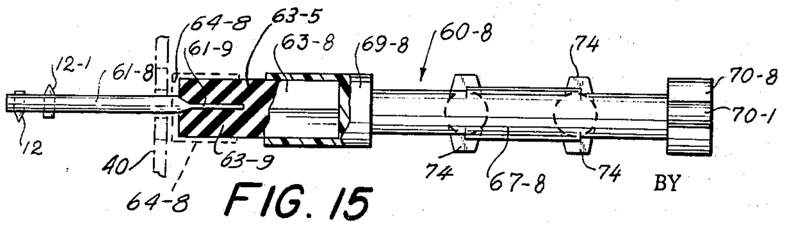
Figures 11, 11A, 12, 12A, 13, 13A, 14:
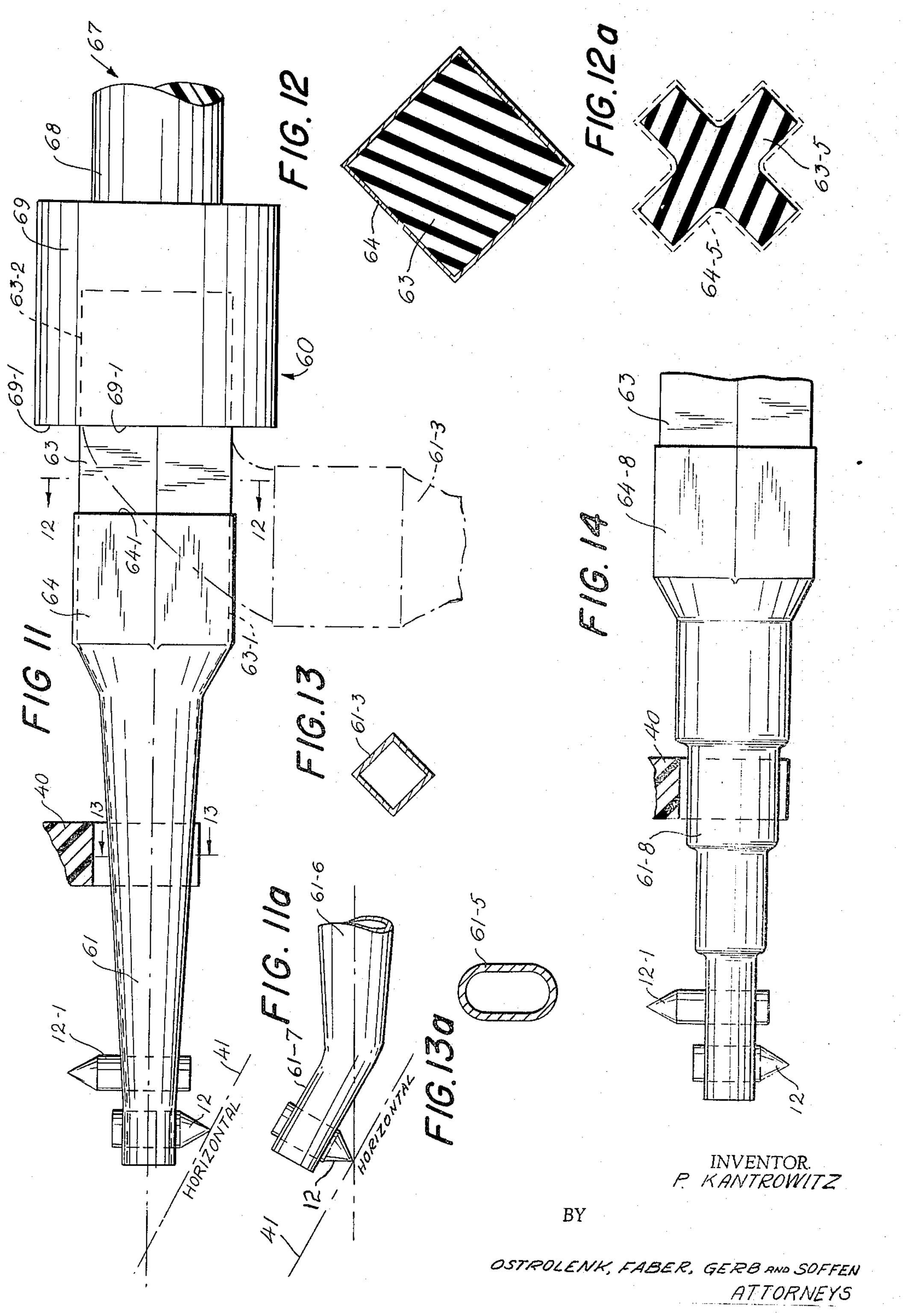

FIG. 11*a* is a view similar to FIG. 11 of a modified form of stylus drive member of the invention;

FIG. 12 is a cross-sectional view along line 12—12 of FIG. 11 showing the cross-section of its elastomer body portion;

FIG. 12*a* is a cross-sectional view similar to FIG. 12 showing a modified form of the elastomer junction body;

FIGS. 13 and 13*a* are cross-sectional views along line 13—13 of FIG. 11 of different modifications of the transducer-coupling portion of the stylus drive member of the type shown in FIGS. 8–12;

FIG. 14 is a view similar to FIG. 11 of a modified form of stylus drive structure exemplifying the invention; and FIG. 15 is a view similar to FIG. 10 of a further modification of the stylus drive structure of the invention.

Figures 1, 2, 3, 4:
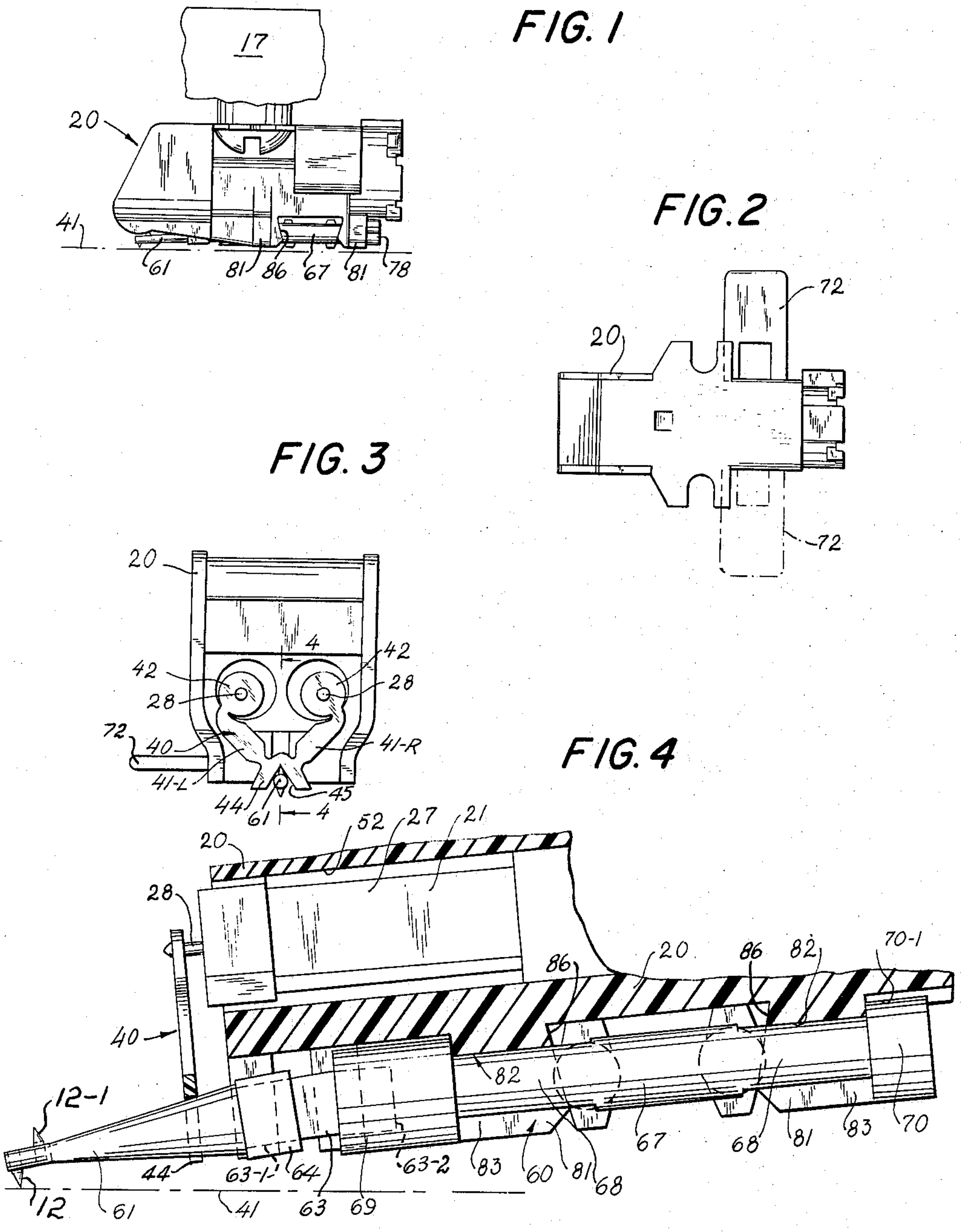
FIG. 1 is a side elevation of a stereophonic pickup operating with a replaceable or detachable stylus holder or drive structure exemplifying one form of the invention, the pickup being shown in a record transducing position.
FIG. 2 is a top view of the pickup of FIG. 1.
FIG. 3 is a front elevation of the same pickup with the metal cover and bracket removed.
FIG. 4 is an enlarged longitudinal cross-section of the lower main portion of the same pickup along line 4—4 of FIG. 3.

A practical embodiment of a replaceable stylus holder or drive structure exemplifying the invention will now be described in connection with a known form of a stereophonic pickup shown in FIGS. 1–7. On a tone arm 17 of a conventional disk phonograph is mounted a stereophonic pickup having pickup housing 20 carrying all its operating elements. The rigid pickup housing has mounted therein two mechano-electric transducers 21 which may be of any known types suitable for such applications including electro-magnetic transducers of the types described in Bachman Patent 2,311,663 and McConnell Patent 2,883,478 having a movable transducer portion which is coupled to the groove engaging stylus. The specific pickup 20 is shown operating with two conventional piezoelectric transducers 21 having their rear portions held restrained in respective two transducer compartments 52 of the casing 20 (FIGS. 3 and 4). Each of the movable front portions 27 of the two transducers 21 has a coupling portion 28 which is coupled through known motion-resolving stereocoupler 40 to the groove engaging stylus 12 so that properly resolved motion components of the minute stylus motion are resolved into their motion components and transmitted by the two coupler arms 41–L and 41–R to the two transducers 21 for generating therein corresponding two stereo-signal sequences. The stereo coupler 40 may be of any known type, such as described in the referred to Keller et al. patent or German Patent 971,346 issued January 15, 1959. The motion resolving coupler 40 has two stylus drive arms or links 41–L, 41–R which are pivotally connected through their stylus coupler portion 44 to the recessed stylus coupling element 45 of the coupler 40. The two stylus drive links 41–L, 41–R are mutually perpendicular and under 45° to the plane of the record surface 11. The outer ends 42 of the two coupler arms 41–L and 41–R are joined to the two transducers 21 by coupling pins which are drivingly coupled and seated in coupling and seating openings of the upper coupler elements 42 of coupler 40.

In accordance with the invention, the pickup has a readily exchangeable or replaceable stylus drive structure comprising an elongated stylus drive member carrying at its front end at least one stylus and shaped for releasable coupling to movable transducer portions of the pickup for driving the same. The replaceable stylus drive structure also has an elongated strong and stiff seating structure extending parallel to or coaxial to and flexibly carrying on its front end the rear end of the elongated stylus drive member. This seating structure has an elongated seating portion arranged to be detachably retained in a seating recess of the pickup structure. An elongated elastomer body of substantial cross section having a flexible separator length is interposed between the front end region of the seating structure and the rear end region of the stylus drive member and constitutes the sole operative connection between them.

FIGS. 8–13 show in detail one example of a replaceable stylus drive structure or stylus holder 60 of the invention, which forms a readily replaceable operating part of a complete pickup such as seen in FIGS. 1–4. Referring to FIGS. 4 and 9–13, the stylus drive structure 60 is of generally elongated shape and comprises relatively light but stiff and mechanically strong elongated stylus drive member 61 which is carried in its operative position by its relatively strong, stiff elongated seating section 67.

Throughout the specification and claims, the front end of the stylus drive structure 60 and the front end of its stylus drive member 61 and of its seating section 67 are designated as the ends of each such structure directed toward the stylus 12 which is carried by the front end of the stylus drive member 61; and the opposite end of each such elongated structure are designated as the rear ends thereof. Thus, the rear end of the stylus drive member 61 is joined to the front end of the seating structure 67 of the stylus drive structure 60.

Figure 8:
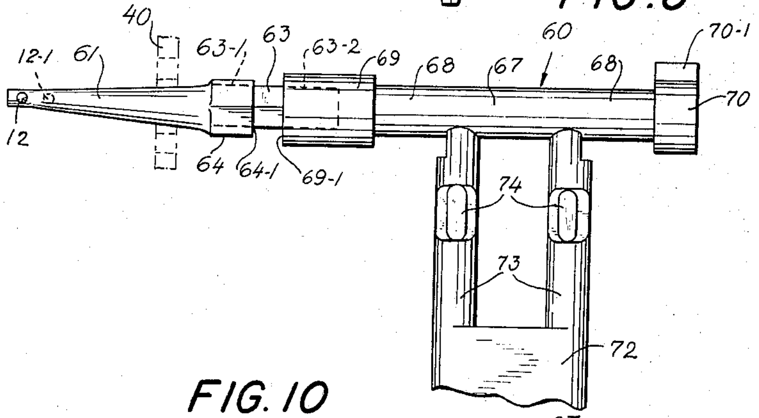
FIG. 8 is a bottom view of the replaceable stylus holder as it is held in the pickup as seen in FIGS. 1 to 4.
Figure 9:
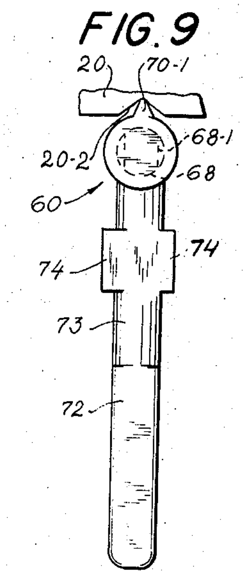
FIG. 9 is a rear end view of pickup portion seen in FIG. 4 with the handle of the same stylus drive structure turned from the normal horizontal to a vertical position.

The seating section 67 of the stylus drive structure is shaped for detachable seating engagement with the downwardly projecting recessed retainer seat portions 81 forming an integral part of the pickup casing 20. The downward casing seating projection or projections 81 of the casing 20 (FIGS. 4 and 5–7) has coaxial interior rotary or cylindrical guide seats 82 with a downwardly facing gate opening 83 of smaller width than the diameter or width of the seating recess 82 of the pickup 20 (FIGS. 8–9). The seating section 67 of the replaceable stylus holder 60 is arranged to be detachably retained within the seating recess or recesses 82 of the casing 20. In the form shown, seating section 67 of the stylus drive structure 60 has two rotary seating portions 68 shaped so that they may be readily inserted with small force into the outwardly opening seating recesses 82 of the casing or housing 20. The stylus-drive-structure seating section 67 has also a front member 69 and a rear member 70 of different widths than its two seating portions 68 so as to fix the axial position of the seating section 67 relatively to the housing and thereby fix the longitudinal operating position or transducer coupling axis of the stylus drive member 61 with its single stylus or two differently directed styli 12, 12–1. The seating section 67 has also a laterally extending handle 72 shown formed integrally with seating section 67 so that the seating section 67 may be rotated around its longitudinal axis while its seating portions 68 are retained in their seating recesses 82 of the bottom housing wall 20. The handle has two handle arms 73 with two lateral stop projections 74 adapted to engage the downwardly facing stop surface of the overlying housing wall 20 so as to stop the handle in either one of two opposite laterally turned positions 72 (FIG. 2), thereby fixing the proper operative position of either one of the two styli 12, 12–1 in alignment with a vertical plane through the transducer coupling axis which is fixed by the coupling recess 45 of the stylus coupling portion 44 of the coupler 40.

The two seating portions 68 of the stylus drive structure member 60 may be made of elastically deformable material of substantial stiffness and rigidity for enabling inward insertion of its two seating portions 68 through the narrower gate openings 83 into the seating recesses 82 of the housing 20 and yet assuring that the normally greater width of the seating portions 68 will be retained and guided for rotation in the cylindrical seating recesses 82 of the pickup housing 20.

The two laterally facing surfaces of seating portions 68 (as seen in FIG. 9 with the handle 72 pointing vertically downward) may be given a somewhat smaller width 68–1 than the major upwardly and downwardly facing cylindrical segmental portions thereof so that the narrower seating side surfaces 68–1 of sealing portions 68 may be readily pushed through the narrow gate opening 83 into the wider cylindrical seating recess 82 of the housing and yet be retained therein even with the handle 72 held in vertical position as seen in FIG. 9.

The seating section 67 with its seating portions 68 are so designed that upon rotating the handle 72 from the vertical position of FIG. 11 to the right or left (FIG. 2) horizontal position within the housing seating recesses 82, these seating portions 68 will be held positively aligned therein by the positive seating engagement of the wider cylindrical surfaces of the seating portions 68 within the recessed cylindrical housing seating surfaces 82. With this arrangement the seating section 67 may be readily removed from the housing seating recesses 82 by turning the handle 72 to the vertical position of FIG. 9 and pulling the handle 72 downwardly to move its narrower side surfaces 68–1 with slight force past the narrower gate opening 83 of the housing seating recess 82.

Figure 5:
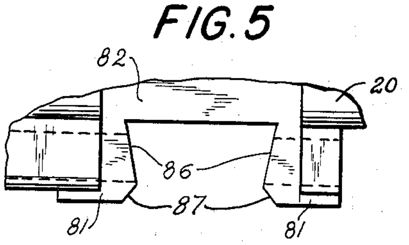
FIG. 5 is an enlarged side view of the rear-bottom portion of the pickup as seen in FIGS. 1 and 4.
Figure 6:
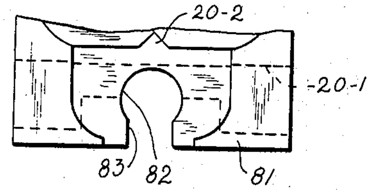
FIG. 6 is an elevational end view of the rear part of the pickup portion seen in FIG. 5.
Figure 7:
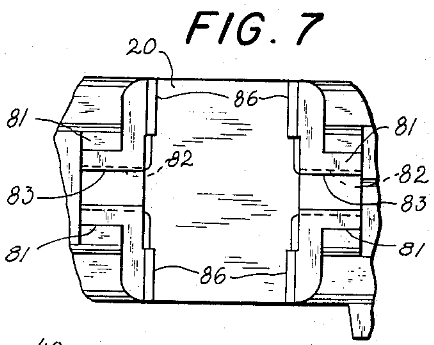
FIG. 7 is a bottom view of the pickup portion seen in FIG. 5.

In the form of the invention shown, the axially spaced inwardly facing end regions of the two stylus-holder recess projections 81 of the pickup housing 20 are provided with two facing downwardly extending bias wall surfaces 86. Each of the two facing bias wall surfaces 86 converge and are shaped for biasing engagement with the outer surfaces of the two spaced elastically deformable handle arms 73, for elastically forcing them closer together when they are moved past the narrower bias entrance between the downward edges 87 of the facing bias surfaces 86 as seen in FIGS. 5, 6 and 8. Having once moved past the narrow bias entrance 87 of the facing handle-retaining bias surfaces 86, the two outwardly biased handle arms 73 will move them along the upwardly divergent housing bias surfaces 86 to their inward, final operative position in which they are shown in FIG. 1. The just described cooperative relation between the pickup housing and the stylus holder seating member 67 constitutes the subject matter of U.S. Patent 3,182,136 assigned to the assignee of the present application.

In accordance with the invention an elongated, relatively light but stiff and elongated stylus drive member 61 is carried by a large cross section elastomer body 63 in its operative position on the pickup by the front member 69 of the seating section 67 of stylus drive structure 60, as seen in detail FIGS. 9, 10, 12 and 13. The elongated stylus drive member 61 has only small mass and may be given great strength by increasing its cross section from a relatively tiny cross section at its styli carrying front end to many times greater cross sectional area at its rear end 64. The stylus drive member 61 may be formed of hollow generally conical structure of strong but thin sheet material having a very narrow front end 62 and a many times wider rear end 64. As examples, the hollow strong stylus drive member 61 may be formed of a thin sheet metal such as an aluminum alloy or a magnesium alloy or of a strong thin plastic sheet material consisting for instance of a tough strong synthetic resin such as acetal-resin polymers of the type sold by E. I. du Pont de Nemours & Co. under its trademark DELRIN or sold by Celanese Corporation of America under its trademark CELCON. The wide rear end 64 of the strong stylus drive member 61 is shown coaxially joined to the relatively rigid front member 69 of the stylus seating section 67 by a relatively large-cross-section-area elastomer body 63 having a separator length interposed between the rear end region 64–1 of the stylus drive member 61 and the front end region 69–1 of the relatively rigid front end 69 of seating section 67. The separator length of the elastomer junction body 63 has a frontwardly projecting elastomer body portion 63–1 which is affixed to the rear end 64 of the stiff stylus drive member 61 and a rear elastomer body portion 63–2 which is affixed to the relatively rigid front member 69 of seating section 67 for operatively joining the elongated stylus drive member 61 to its stiff and relatively rigid seating section 67 while interposing between their facing ends 64 and 69 an elastomer body length 63 of a predetermined large cross sectional area and having a predetermined selected compliance for controlling in a predetermined selected manner the operating characteristics of the stylus drive structure 60.

A selected coaxial separator length 63 of the wide-area elastomer junction body is thus interposed between the rear end 64–1 of stylus drive member 61 and the front end 69–1 of rigid coaxial seating section 67 of elongated stylus drive structure 60. The elastomer body 63 is given such large cross section area as to assure a firm coaxial pivot support for the rear end of the rigid stylus drive member 61 as its front end is moved by its record-groove-engaging stylus 12.

The interposed length of the wide-area elastomer body junction 63 provides a damped pivot junction which permits bending of the elongated stylus drive member 61 relatively to stiff seating section 67 of stylus drive member without possibility of damage thereto or upsetting their operative alignment.

The small area front end of the stylus drive member 61 enables reducing of the effective stylus mass.

The wide-area mass of the elastomer separator length interposed between the rigid stylus drive member 61 and its rigid stylus section makes it possible to vary its compliance over an extraordinary wide range for selectively providing pickups with very high compliance or very low compliance or any of other intermediate compliance value selected from such wide range of compliance variations.

The end portions 63–1, 63–2 of the elastomer junction body 63 by which it is affixed to the stylus-drive-member rear end portion 64 and the seating-section front end portion 69 may be of a shape which clampingly embraces them. FIGS. 5–12 show the elastomer-body junction end portions 63–1 held affixed or clamped within the interior of hollow recess spaces of the stylus-drive-member rear end 64 and the seating-section rear end member 69.

A thin coating of cement may be used to provide a cementious union between the facing surfaces of the elastomer body end portions 63–1 and stylus-drive-member seating section 67 are affixed to each other.

A good alignment-junction between the rear end 64 of stylus drive member 61 and front end 69 of the seating section 67 may be obtained with an elastomer junction body 63 having a cross section which gives it a generally continuous exterior surface, such as a cylindrical or elliptical cross section.

The cross sectional area of the elastomer junction body 63 may be given any desired shape. The desired alignment is secured in specific elastomer junction body 63 of FIGS. 4–13 by giving it a rectangular square cross sectional area as shown in FIG. 12. Alternatively, the elastomer junction body 63 may be given a cross-shaped cross sectional area 63–5 indicated in FIG. 12*a*.

The stylus drive member 61 of FIG. 11 may be modified in the manner shown by stylus drive member 61–6 of FIG. 11*a*. Its narrow front end 61–7 is turned vertically relatively to its major dash-dot-line longitudinal axis so that the groove-engaging point of its stylus 12 is aligned with this dash-dot-line axis.

The major length of the stylus-drive-member 61 may be given any desired cross sectional shape. The stylus drive member 61 of FIGS. 1–12 has a circular cross section. The stylus-to-transducer coupler 40 (FIGS. 3–5) has a stylus coupling portion 44 with a coupling recess 45 shaped to assure that the biasing forces applied by the elastomer junction body 63 to the stylus drive member 61 shall keep the coupling portion therof stably engaged with the stylus coupling portions 44 bordering its coupling recess 45.

The coupling portion of stylus-drive-member 61 which is engaged by coupling portion 44 of the stylus-to-transducer coupler 40 may be given a polygonal or rectangular cross section as shown at 61–3 in FIG. 13 or an oval cross-section as seen in FIG. 13*b*.

Various modifications of the stylus-drive-structures based on the invention described above will suggest themselves to those skilled in the art. As an example, instead of giving the stylus-drive-member 61 a rearwardly tapering conical surface, the stylus-drive-member may be of the shape shown in FIG. 14 having a modified stylus drive member 61–8 of the shape shown in FIG. 14. Referring to FIG. 14, the stylus-drive-member 61–8 has a series of generally tubular or cylindrical hollow tubular sections of successively large cross section from the smallest cross section area of its front end carrying the two styli 12, 12–1.

The principles of the invention underlying the replaceable or detachable stylus drive structures for a phonograph pickup described above, and having a large cross-section elastomer junction body projecting frontward beyond the front end of its stiff seating structure for joining thereto the stylus drive member is also of great value in stylus drive structures having a thin stylus carrying drive member, as described for instance in Klingener Patent 2,717,-929. FIG. 15 shows a detachable stylus drive structure 60–8 of the invention which is similar to that described in detail in connection with FIGS. 5, and 8 to 10 except that it has a light mass stylus drive member 61–8 which is thin throughout its length.

Referring to FIG. 15 (corresponding to FIG. 10) the stylus drive structure 60–8 has seating structure 67–8 identical with that previously described except that its forward seating end portion 69–8 is longer and extends with its greater length in a forward direction. Within a coaxial hollow front recess of seating-member front element 69–8 is coaxially fixed the rear end of an elongated elastomer body 63–9 of large cross-section. The front section of this elastomer body 63–9—a substantial length of which projects beyond the front end of seating structure 67–8—is provided with a concentric seating recess, for instance, a flat or cross-shaped cross-section for holding fixed and in coaxial alignment the rearward coaxial flattened end 61–9 of a thin rod-shaped light-mass elongated stylus drive member 61–8 carrying at its front end two oppositely directed styli 12, 12–1. This arrangement makes it possible to reduce the length of and the mass of the stylus carrying drive member 61–8 while fixing the operative position of its rear end with a bendable large cross-section elastomer function body 63–8 which is held in predetermined coupling alignment by the rigid front end portion 69–8 of its stylus seating structure 67–8 to assure efficient transmission of the stylus motion to the transducer elements. As an example, the thin stylus drive rod 61–8 may be made of a light-mass hollow tubing of light metal such as aluminum which will effectively transmit the motion of the stylus to the transducer coupler 40 shown in dash-line in FIG. 15. As an example, the total length of stylus drive member 61–8 from its styli to rear end is 0.200 inch and its coupling connection to the coupling member 40 is 0.050 inch from its rear end. With such arrangement the motion of the stylus will be transmitted to the transducer coupling member 40 and therethrough to the transducer elements with a transformation ratio of 64.

Alternatively the front end of outwardly projecting elastomer body 63–8 has affixed thereto a stiff enclosure 64–8 of metal or strong plastic (corresponding to rear end 64 of the stylus drive member 61 described in connection with FIGS. 5–13) which however has a front wall 64–9 with a positive central aligning opening or coaxial channel for receiving or holding in coaxial alignment the rear end of thin stylus drive rod 61–8 such as shown in FIG. 15. Such thin stylus drive rod 61–8 may be formed as single structure with the wide rear end 64–8.

In stylus drive structures of the invention, either of the type described in connection with FIGS. 5–13 or of the type described in connection with FIG. 15, the stylus drive member 61 or 61–8 may be flexed on the outwardly projecting large cross-section elastomer pivot support 63 or 63–8 ninety degrees or more from its axially aligned position without damage to or disturbance of their normal coaxial operative position on the pickup in which the stylus drive member is maintained and to which it is restored or returned by the large cross-section elastomer junction body 63 or 63–8, respectively. FIG. 11 shows in dash-lines 61–3 the stylus drive member 61 so flexed ninety degrees from its normal coaxial position, and also how the stylus drive member 61–8 of FIG. 15 may be similarly flexed without in any way impairing their desirable normal transducer-aligned operating characteristics.

The principles of the invention disclosed herein in connection with specific exemplifications thereof, will suggest various other modifications of the same. It is accordingly desired that the appended claims shall not be limited to the specific exemplifications of the invention described above.

I claim:

1. A replaceable stylus drive structure for driving movable transducer coupling portions of mechano-electric transducer means of a phonograph pickup structure comprising, an elongated stylus drive member arranged for detachable operative mounting adjacent said transducer means and having a rear pivot end region and an opposite front end of small cross-section circumference carrying at least one transversely extending stylus, a generally parallel relatively stiff elongated seating member having a front seating end region joined to and carrying said drive member, said seating member defining a coupling axis for effecting coupling of said stylus drive member with said transducer coupling portions and having at least one longitudinal seating portion adapted to be detachably retained within a seating recess of the pickup structure, and an extensive junction elastomer body of substantial circumference having opposite elastomer end portions affixed to said seating member front end region and to said nearby drive member rear pivot end region, said elastomer body having an intermediate flexible elastomer pivot section projecting beyond said front end region of said seating member and also beyond said nearby rear pivot end region of said drive member and having a length interposed between said nearby end regions of said two elongated members and also being free of flexure suppressing confining engagement with said elongated member for enabling said drive member to be flexed with said elastomer pivot section by at least 90° from its operative alignment with said coupling axis, said elastomer pivot section being stretchable and compressible and having a cross-section circumference materially and sufficiently greater than said drive member front end and containing enough of said elastomer body to cause the elastic forces of said pivot section to return said drive member from an angularly flexed position to said operative alignment with said coupling axis.

2. In combination with a stylus drive structure as claimed in claim 1, a pickup structure comprising at least one operatively held mechano-electric tranducer means, a coupling structure having a coupling portion connected to said transducer means and a further coupling portion held and shaped for detachable coupling to said stylus drive member and transmitting motion components thereof to said transducer means, said pickup structure including retainer means for detachably retaining the seating member of said stylus drive structure on said pickup structure with said stylus drive member held coupled through said coupling structure to said transducer and transmitting stylus motions thereo.

3. In combination with a stylus drive structure as claimed in claim 1, said stylus drive member having two differently directed styli and said seating member having a rotary seating portion, a coupling structure having a coupling portion connected to said transducer means and a further coupling portion held and shaped for detachable coupling to said stylus drive member and transmitting motion components thereof to said transducer means, said pickup structure including retainer means for detachably rotating the seating member of said stylus drive structure on said pickup structure with said stylus drive member held coupled through said coupling structure to said transducer means and transmitting stylus motions thereto from one of said two styli, said retainer means having a rotary guide surface rotatably supporting the seating member of said stylus drive structure for rotating said stylus drive structure thereon to selectively bring either one of said two styli into a record engaging position.

4. A replaceable stylus drive structure for driving movable transducer coupling portions of mechano-electric transducer means of a phonograph pickup structure comprising, an elongated stylus drive member arranged for detachable operative mounting adjacent said transducer means and having a rear pivot end region and an opposite front end of small cross-section circumference carrying at least one laterally extending stylus, a generally parallel relatively stiff elongated seating member having a front seating end region joined to the nearby adjacent rear pivot end region of and carrying said drive member, said seating member defining a coupling axis for effecting coupling of said stylus drive member with said transducer coupling portions and having at least one longitudinal seating portion adapted to be detachably retained and rotated within a seating recess of the pickup structure, and an extensive junction elastomer body of substantial circumference having opposite elastomer end portions affixed to said nearby rear pivot end region and to said nearby front seating end region of said two elongated members, said elastomer body having an intermediate flexible elastomer pivot section projecting beyond said nearby end regions and having a length interposed between said nearby end regions of said two elongated members for enabling said drive member to be flexed with said elastomer pivot section by at least 90° from its operative alignment with said coupling axis, said elastomer pivot section being compressible and stretchable and having a cross-section circumference materially and sufficiently greater than said drive member front end and containing enough of said elastomer body to cause the elastic forces of said pivot section to return said drive member from an angularly flexed position to said operative alignment with said coupling axis.

5. In combination with a stylus drive structure as claimed in claim 4, a stereophonic pickup structure comprising two operatively held mechano-electric transducers, a coupling structure having two coupling portions connected to said transducers and a further coupling portion held and shaped for detachable coupling to said stylus drive member and transmitting motion components thereof to said two transducers, said pickup structure including retainer means for detachably retaining the seating member of said stylus drive structure on said pickup structure with said stylus drive member held coupled through said coupling structure to said two transducers and transmitting stylus motions thereto.

6. In combination with a stylus drive structure as claimed in claim 4, said stylus drive member having two differently directed styli and said seating member having a rotary seating portion, a stereophonic pickup structure comprising two operatively held mechano-electric transducers, a coupling structure having two coupling portions connected to said transducers and a further coupling portion held and shaped for detachable coupling to said stylus member and transmitting motion components thereof to said two transducers, said pickup structure including retainer means for detachably retaining the seating member of said stylus drive structure on said pickup structure, said retainer means having a rotary guide surface rotatably supporting the seating member of said stylus drive structure for rotating said stylus drive structure thereon to selectively bring either one of said two styli into a record engaging position.

7. A replaceable stylus drive structure for driving movable transducer coupling portions of mechano-electric transducer means of a phonograph pickup structure comprising:

an elongated stylus drive member arranged for detachable operative mounting adjacent said transducer coupling portions having a front end of small cross-section circumference carrying at least one transversely extending stylus and also a rear pivot end region of small cross-section circumference, a generally parallel relatively stiff elongated seating member having a front seating end region joined to the nearby rear pivot end region of and carrying said drive member, said seating member defining a predetermined coupling axis for securing coupling of said stylus drive member with said transducer coupling portions and having at least one longitudinal portion adapted to be detachably retained within a seating recess of the pickup structure, and an extensive elastomer junction body having opposite elastomer end portions affixed to said seating member front end region and to said nearby drive member rear pivot end region, said elastomer junction body having an intermediate flexible elastomer pivot section of material length projecting beyond said front end region of said seating member and also beyond said nearby rear end region of said drive member and having a length interposed between said nearby end regions of said two elongated members, said small cross-section rear pivot end region of said stylus drive member extending through the interior of and terminating within the front end portion of said elastomer junction body, said interposed elastomer pivot section being sufficiently free of flexure suppressing confining engagement with said two elongated members and being freely elastically flexible with the adjoining stylus drive member for enabling flexing of said drive member by at least 90° angularly from alignment with said coupling axis, said intermediate elastomer pivot section being compressible and stretchable and having a cross-section circumference materially and sufficiently greater than said stylus drive member rear end and containing enough of said elastomer body to cause the elastic restoring forces of said elastomer pivot section to return said stylus drive member from an angularly flexed position to said coupling axis.

8. A replaceable stylus drive structure for driving movable transducer coupling portions of mechano-electric transducer means of a phonograph pickup structure comprising:

an elongated stylus drive member arranged for detachable operative mounting adjacent said transducer coupling portions having a rear pivot end region and a front end of small cross-section circumference carrying at least one transversely extending stylus and also being of small cross-section circumference over the length extending to said rear pivot end region, a generally parallel relatively stiff elongated seating member having a front seating end region joined to the nearby rear pivot end region of and carrying said drive member, said seating member defining a coupling axis for securing coupling of said stylus drive member to said transducer coupling portions and having at least one longitudinal seating portion adapted to be detachably retained within a seating recess of the pickup structure, and an extensive elastomer junction body having opposite elastomer end portions affixed to said seating member front end region and to said nearby drive member rear pivot end region, said elastomer junction body having a definite intermediate flexible elastomer pivot section of material length projecting beyond said front end region of said drive member and having a length interposed between said nearby end regions of said two elongated members, said small circumference rear pivot end region of said stylus drive member extending through the interior of and terminating within the front end portion of said elastomer junction body, said interposed elastomer pivot section being free of flexure suppressing confining engagement with said two elongated members and being freely elastically flexible with the adjoining stylus drive member by at least 90° from alignment with said coupling axis, said intermediate elastomer pivot section being compressible and stretchable and having a cross-section area many times and sufficiently greater than said small cross-sectional area of said stylus drive member rear end and containing enough of said elastomer body to cause the elastic restoring forces of said elastomer pivot section to return said stylus drive member from an angularly flexed position to said coupling axis.

9. A replaceable stylus drive structure for driving movable transducer coupling portions of mechano-electric transducer means of a phonograph pickup structure comprising:

an elongated stylus drive member arranged for detachable operative mounting adjacent said transducer coupling portions having a front end of a first small cross-section circumference carrying at least one transversely extending stylus, a generally parallel relatively stiff elongated seating member having a front seating end joined to the nearby adjacent rear pivot end of and carrying said drive member, said seating member front end having a second cross-section circumference materially greater than said first cross-section circumference of said stylus drive member, said seating member defining a coupling axis along which said stylus drive member is held coupled to said transducer coupling portions and having a longitudinal portion shaped for seating on said pickup structure, and an elongated elastomer junction body having opposite elastomer end portions affixed to said seating member front end and to said nearby drive member rear end, said elastomer body having a definite intermediate flexible elastomer pivot section of material lengh projecting beyond the end surface of said seating member front seating end and the end surface of the nearby drive member seating end and longitudinally interposed between said nearby end surfaces of said two elongated members, said interposed elastomer pivot section being free of flexure suppressing confining engagement with said two elongated members and being freely elastically flexible with the adjoining stylus drive member at least 90° from alignment with said coupling axis, said intermediate elastomer pivot section being compressible and stretchable and having a cross-section circumference greater than said first cross-section circumference but materially closer to said second cross-section circumference than said first cross-section circumference and being of sufficiently greater circumference and containing enough of said elastomer body to cause the elastic forces of said elastomer pivot section to return said stylus drive member from a laterally flexed position to said coupling axis.

10. A replaceable stylus drive structure as claimed in claim 9, said elastomer pivot section having a cross-section circumference many times greater than said first cross-section circumference.

References Cited by the Examiner

UNITED STATES PATENTS 2,717,929 9/1959 Klingener -------- 179—100.41

OTHER REFERENCES

Freise: German allowed application 1,090,442, 10/1960.

BERNARD KONICK, *Primary Examiner.*